No. 608,181. Patented Aug. 2, 1898.
W. W. COREY, Jr.
VALVE FOR STEAM PUMPS.
(Application filed Jan. 17, 1898.)
(No Model.) 2 Sheets—Sheet 1.
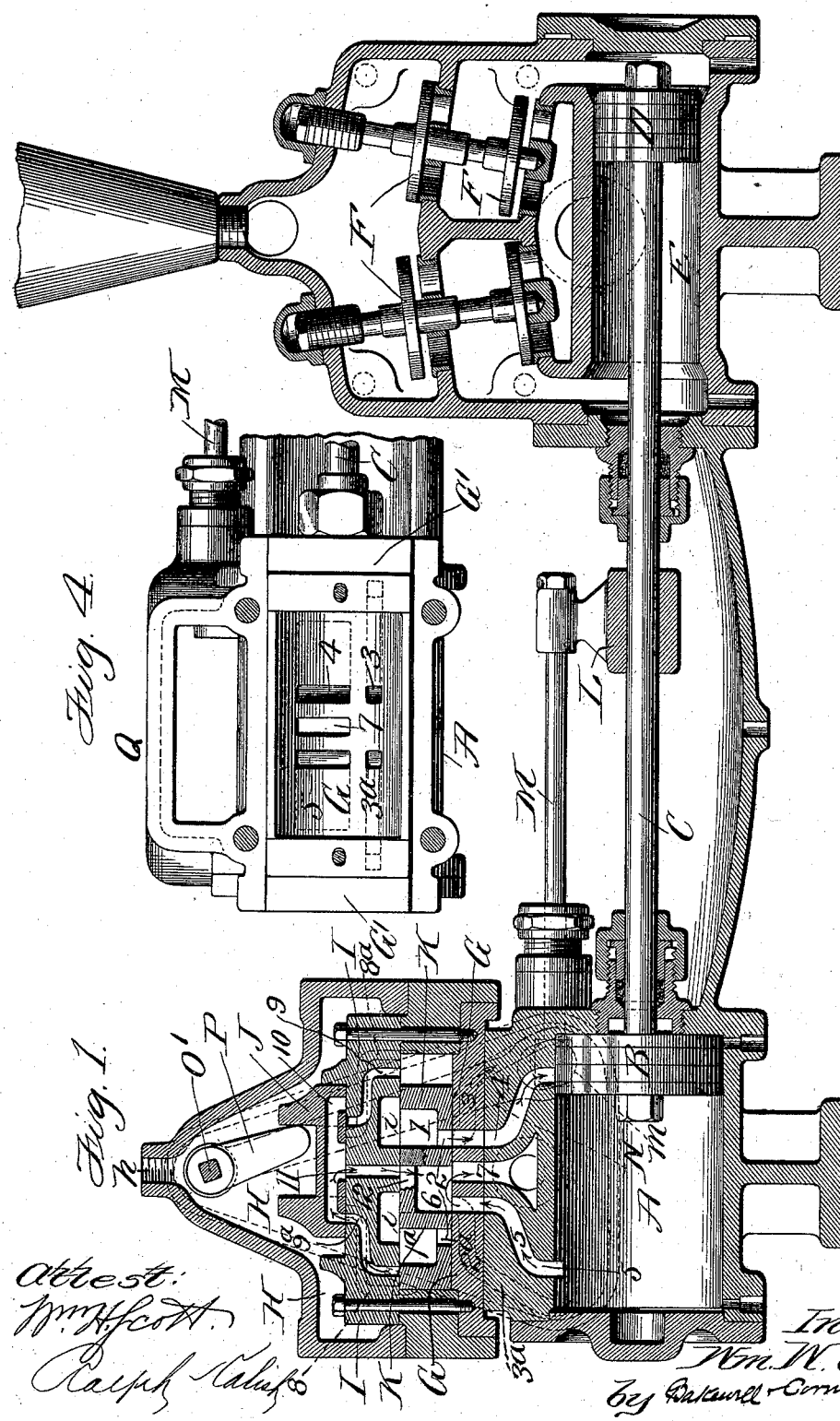

No. 608,181. Patented Aug. 2, 1898.
W. W. COREY, Jr.
VALVE FOR STEAM PUMPS.
(Application filed Jan. 17, 1898.)
(No Model.) 2 Sheets—Sheet 2.
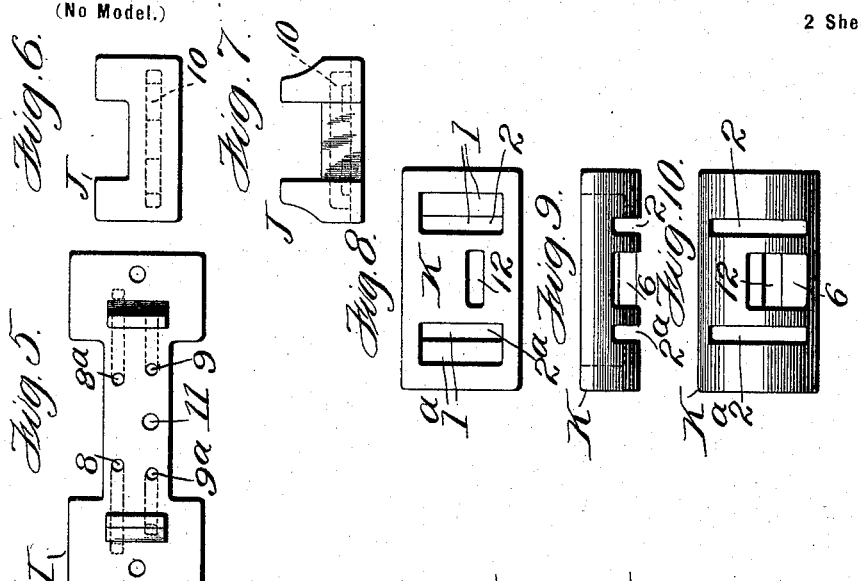
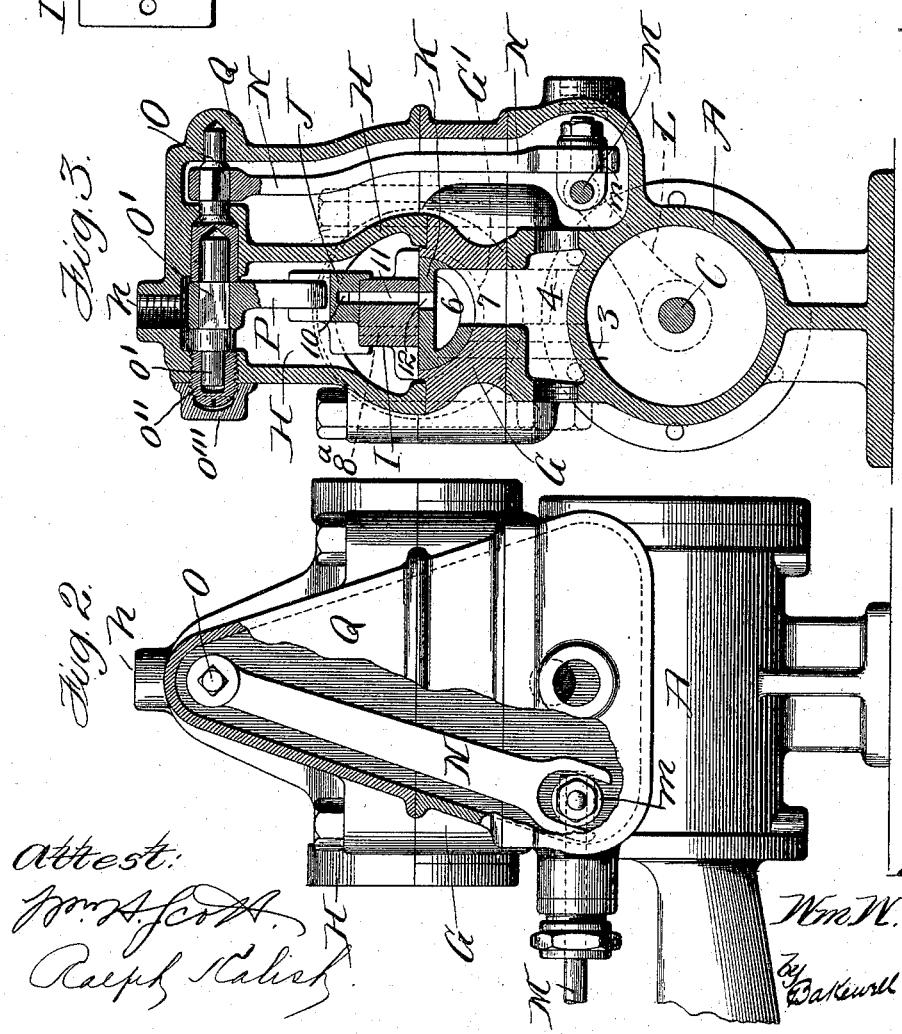
Attest:
Wm H Scott
Ralph Kalish
Inventor:
Wm. W. Corey, Jr.
by Bakewell & Cornwall
Attys

UNITED STATES PATENT OFFICE.

WILLIAM W. COREY, JR., OF ST. LOUIS, MISSOURI.

VALVE FOR STEAM-PUMPS.

SPECIFICATION forming part of Letters Patent No. 608,181, dated August 2, 1898.

Application filed January 17, 1898. Serial No. 666,850. (No model.)

*To all whom it may concern:*

Be it known that I, WILLIAM W. COREY, Jr., a citizen of the United States, residing at the city of St. Louis, State of Missouri, have invented a certain new and useful Improvement in Valves for Steam-Pumps, of which the following is a full, clear, and exact description, such as will enable others skilled in the art to which it appertains to make and use the same, reference being had to the accompanying drawings, forming part of this specification, in which—

Figure 1 is a vertical sectional view through my improved steam-pump. Fig. 2 is a side elevational view of the opposite side of the engine, the housing being broken away to show the valve mechanism. Fig. 3 is a cross-sectional view on line 3 3, Fig. 1. Fig. 4 is a plan view on line 4 4, Fig. 3. Fig. 5 is a plan view of the valve-seat for the slide-valve. Figs. 6 and 7 are detail views of the slide-valve. Fig. 8 is a top plan view of the semicircular fluid-thrown valve. Fig. 9 is a side elevational view of the same, and Fig. 10 is a bottom plan view of said valve.

This invention relates to a new and useful improvement in steam-pumps, being designed particularly as an improvement upon the steam-pump forming the subject-matter of United States Letters Patent No. 578,317, granted to me March 9, 1897.

The objects of my present invention are, first, to construct the steam-valves of a direct-acting steam-pump in such manner that in the event of wear thereof said valves may be locally repaired without necessitating the renewal of the parts, and to accomplish this I construct a main valve semicircular in cross-section and provide a conversely-shaped seat therefor, upon which and on the flat face of the main valve is arranged a valve-block, said valve-block carrying a flat-faced auxiliary cut-off or slide valve which is mechanically operated, which slide-valve admits and exhausts pressure to and from the ends of the main valve to operate said main valve to admit and exhaust pressure to and from the ends of the cylinder. By forming the upper face of the main valve flat and the coöperating face of the valve-block in like manner I am enabled to grind or scrape such flat faces, which results in practically a renewal of the parts. In this grinding or scraping action I also include the valve seat and plugs in the ends thereof, making such parts flush with the flat face of the main valve. The auxiliary or mechanically-operated slide-valve can be made tight in the same manner.

A second object is to arrange the steam-valve and the valve-gear of a direct-acting steam-pump so that steam will be supplied to the piston in such manner that the piston will start or come to rest at the end of a stroke without a shock or jar.

A third object is to inclose the actuating mechanism for the auxiliary slide-valve within a housing or casing forming an integral part of the structure, into which housing I introduce the exhaust-steam, which carries with it more or less lubricating-oil used in the cylinder, whereby the moving parts of said valve-operating mechanism are constantly lubricated.

A fourth object and, as is well known, the prime object in constructing a direct-acting pump is to effect a positive action of the piston, which can only be accomplished by the constant tight fitting of the valves which control the admission and exhaust of steam to and from the piston. This correct fit of the valves I obtain by the construction illustrated in the accompanying drawings.

With these objects in view the invention consists in the construction, arrangement, and combination of the several parts, all as will hereinafter be described and afterward pointed out in the claims.

In the drawings, A indicates a steam-cylinder; B, the piston; C, the piston-rod, on the other end of which is arranged a plunger D, operating in pump-cylinder E, and F valves in the water side of the pump, which are of the usual arrangement to control the suction and discharge of the water.

G indicates a valve-seat for a semicircular fluid-thrown valve, which is arranged above the cylinder A or to one side thereof, as may be desired, the ends of said valve-seat being closed by suitable plugs G'.

H indicates the steam-chest bolted above the valve-seat G, into which steam-chest steam or other motive fluid is admitted through a suitable duct $h$, suitable pipes being employed to connect with the source of supply, as is obvious.

I indicates a valve-block bolted above the valve-seat G, said block holding a semicircular fluid-thrown valve in its seat and also affording a seat for a mechanically-operated slide or auxiliary valve J, mounted thereabove.

K indicates the semicircular fluid-thrown valve operating in valve-seat G.

L indicates a cross-head arranged on the piston-rod C and carrying rod M, which has arranged on its other end a roller $m$, (shown in Fig. 2,) which roller operates in the bifurcated end of a rock-arm N. This rock-arm, as shown more clearly in Fig. 3, is mounted on the square portion of a spindle O, which spindle has a squared socket in its inner end for receiving a correspondingly-shaped plug O′, which plug carries a tappet P, coöperating with the slide-valve J to throw the same. Plug O′ is formed with a reduced circular portion $o'$ at its other end, which fits into a socket formed in a removable bearing or thimble $o''$, threaded in the side wall of the steam-chest to adjust the lateral position of said plug O′, said removable bearing or thimble receiving a jam-nut on its outer end, which impinges against the outer face of the steam-chest to lock said plug in its adjusted position.

Spindle O, which carries the arm N, is formed with a circular cone-bearing on its inner end, which is held tightly to its seat by the pressure in the steam-chest, and at any time that the bearing becomes worn the bearing or thimble $o''$ may be adjusted inwardly to take up such wear, after which it is locked in its adjusted position by the jam-nut $o'''$. The outer end of spindle O finds a bearing in a housing Q, which is preferably steam-tight and which receives the exhaust of the engine. This housing, as shown more clearly in Figs. 2 and 3, is made of registering sections projecting from the cylinder A, valve-seat G, and steam-chest H, said housing being arranged to one side of the pump and inclosing the moving parts of the valve-operating mechanism. By running the exhaust into this housing the oil from the cylinder carried by the exhausting steam will lubricate the joints of the valve-operating mechanism, which, as is obvious, is an advantageous feature. Again, by inclosing the moving parts of the valve-operating mechanism little or no dust can enter to cut the joints.

Suitable packing is provided for the rod M where it enters the housing.

As shown in Fig. 5, the valve-block I is substantially I-shaped in plan view, in addition to which two transversely-arranged channels or recesses $i$ are cut or formed in its under face, so that the pressure in the steam-chest may be exerted on the exposed upper face of the semicircular fluid-thrown valve K, tending at all times to force said valve K to grind a perfect seat for itself.

Assuming the parts to be in the position shown in Fig. 1, the piston being at the inner limit of its movement, the slide-valve J will be at the right extremity of its stroke and the semicircular fluid-thrown valve K will be at the left extremity of its stroke. This will cause the pressure in the steam-chest to pass through chamber 1 in the upper face of the fluid-thrown valve K through opening 2 into passages 3 and 4, both leading to the right-hand end of cylinder A. Passage 3 is what I term an "advance" passage leading to the extreme end of cylinder A and admitting pressure fluid behind the piston B to give the same an initial movement, after which the pressure fluid flowing through passage 4 will admit a sufficient volume of steam behind the piston. Passage 3 is comparatively small, as shown in Fig. 4, while passage 4 is of a sufficient size to admit the required amount of steam behind the piston. The steam in front of the piston B will exhaust through passage 5, leading from the opposite end of cylinder A, chamber 6 opening at the lower face of fluid-thrown valve K and to one side thereof and exhaust-passage 7 into the housing containing the slide-valve-operating mechanism, whence it is let out.

As shown in Fig. 3, chamber 6 and passage 7 are located to one side of the center of the device, so as to leave room for the passages 3 and $3^a$. When the piston B closes the passage 5, valve K still remains in the position above described, in which passage $3^a$ is closed and the extremity of the stroke of the piston in this direction is cushioned. When the piston reaches this position, the tappet P will have started to move the slide-valve J to its other position, in which event the pressure from the steam-chest passes through a passage 8 in the valve-block I to the left-hand end of the valve-seat G, admitting pressure at the left of the semicylindrical valve K. The pressure at the right of said valve is exhausted through a passage 9, located some distance from the plug G′, so as to cushion the stroke of said valve, said passage 9 leading into a passage 10 on the under side of slide-valve J, which passage 10 communicates with a passage 11 in said valve-block, said passage 11 opening into chamber 6 through the medium of a slotted opening 12 in the valve K, which is constantly open to said passage 11. As the slide-valve J moves from its position at the right to its position at the left passage 8 remains open the whole time the slide-valve is in this position, and a passage $9^a$, which is an exhaust-passage corresponding with the exhaust-passage 9, only at the opposite end of the engine, is closed. These ports or passages 8 $8^a$, 9 $9^a$, and 11 in the valve-block I, I term the "auxiliary" ports, in that they coöperate with the auxiliary or mechanically-operated slide-valve J to operate the main valve K. The slide-valve J now having been moved and the semicylindrical valve K having been thrown, the pressure enters into a chamber 1ª, corresponding to chamber 1, heretofore described, but in the opposite end of valve K, through opening 2ª and passages 3ª and 5, 3ª giving to the piston an initial movement and 5 admitting the necessary volume of pressure to move said piston. The pressure at the inner end of cylinder A is now exhausted through passage 4, chamber 6, and exhaust-passage 7, as before described, the passage 3 being closed by the "blind" side of valve K.

Slide-valve J is cut away on one side to coöperate with the admission-ports 8 and 8ª, leading to opposite ends of the valve K to throw said valve, one of said ports being open while the other is closed, and vice versa. The slide-valve J also controls the exhaust from the ends of valve K, valve K controlling the admission and exhaust of the pressure on each side of the piston B, said valve admitting an initial pressure through an auxiliary port when the piston is moving in one direction and "blinding" said auxiliary port when the piston is moving in the opposite direction, so as to cushion said piston, the "auxiliary" ports, as I have termed them, being the ports or passages marked 3 and 3ª, to which I have heretofore referred.

The pump proper forms no part of this invention, and from the above it will be seen that the engine is compact, simple in construction, and easily assembled.

In the event that any of the parts become worn the raised contacting faces may be planed off, substantially as described in the patent before referred to.

I am aware that many minor changes in the construction, arrangement, and combination of the several parts of this engine can be made and substituted for those herein shown and described without in the least departing from the nature and principle of my invention.

Having thus described my invention, what I claim, and desire to secure by Letters Patent, is—

1. The combination with a valve-seat, of a semicylindrical fluid-thrown valve arranged therein, a valve-block arranged upon said valve-seat, and coöperating with the flat face of said fluid-thrown valve, said valve-block containing all the auxiliary ports for operating said fluid-thrown valve, and a mechanically-operated slide-valve operating on said valve-block, to control said auxiliary ports for the main, or fluid-thrown, valve, substantially as described.

2. The combination with a valve-seat, of a semicylindrical fluid-thrown valve arranged therein and formed with passages to supply steam to the cylinder, a valve-block formed with passages for supplying steam to the steam-passages in the main valve, the ends of said valve-block covering the ends of said fluid-thrown valve, said valve-block also containing the admission and exhaust ports leading to and from the ends of said fluid-thrown valve, and a mechanically-operated slide-valve coöperating with said ports to admit and exhaust pressure to and from the ends of said fluid-thrown valve, substantially as described.

3. The combination with a valve-seat, of plugs in each end thereof, a semicylindrical valve operating in said seat, a valve-block mounted upon said plugs and coöperating with the flat face of said valve, said valve-block containing the admission and exhaust ports leading to and from the ends of said fluid-thrown valve, and a slide-valve operating upon said valve-block for controlling said ports, substantially as described.

4. The combination with a valve-seat, of plugs in each end thereof, a semicylindrical fluid-thrown valve mounted in said seat, a valve-block having a flat lower face for coöperating with said valve-seat, plugs and the flat face of said fluid-thrown valve, whereby, when any of said parts are worn, the flat faces thereof may be ground or scraped and refitted, and a mechanically-operated slide-valve mounted upon the valve-block, for controlling the ports in said valve-block leading to and from the ends of the semicylindrical fluid-thrown valve, substantially as described.

5. The combination with a valve-seat, of a semicylindrical fluid-thrown valve arranged therein, a valve-block containing ports for operating said valve, said valve-block being reduced at its sides and formed with spaces $i$ in its under face which spaces open to the steam-pressure, and a mechanically-operated valve coöperating with said valve-block to control the ports therein, substantially as described.

6. The combination with a main valve, of a valve-block containing ports 8, 8ª, 9, 9ª, and 11, said valve-block being reduced at its sides, and formed with spaces $i$ on its under side, and a slide-valve J having a reduced side to coöperate with the ports 8 and 8ª of said valve-block, and a port 10 having suitable openings adapted to coöperate with ports 9, 9ª, and 11 of said valve-block, substantially as described.

7. The combination with a cylinder, of main inlet and exhaust passages leading thereinto and near the ends thereof, auxiliary passages leading into the extremities of said cylinder, a valve provided with suitable openings or chambers which are adapted to register with said passages, said valve being, also, provided with a blind side adapted to close the auxiliary passage when the pressure is exhausting from that end to which said auxiliary passage leads, substantially as described.

8. The combination with a slide-valve, of a tappet for throwing the same, a plug upon which said tappet is mounted, a socketed spindle for receiving one end of said plug, and an adjustable bearing or thimble for receiving the other end of said plug, substantially as described.

9. The combination with a slide-valve, of a tappet for throwing the same, a plug upon which said tappet is mounted, a socketed spindle for receiving one end of said plug, an adjustable bearing or thimble for receiving the other end of said plug, and means for locking said adjustable bearing or thimble in an adjusted position, substantially as described.

10. The combination with a slide-valve, of a tappet for throwing the same, a plug upon which said tappet is mounted, a socketed spindle for receiving one end of said plug, said spindle having a cone-bearing in the side wall of a steam-chest, whereby a tight joint may be made, an adjustable bearing for the other end of said plug, and a lever located outside the steam-chest and mounted upon said socketed spindle for actuating the same, substantially as described.

11. The combination with a steam-chest, of a socketed spindle having a cone-bearing therein, a lever mounted on the outer end of said spindle, a plug which is received in the socket in the inner end of said spindle, a tappet mounted on said plug, a bearing for the other end of said plug, which bearing is threaded in the wall of the steam-chest, and a jam-nut which is secured on the outer end of said adjustable bearing, substantially as described.

12. The combination with a steam-chest, of a spindle passing therethrough, a cone-bearing for said spindle, and a tappet arranged in the steam-chest, which tappet is operated by said spindle, said cone-bearing being kept ground to its seat by the pressure of steam in the steam-chest, substantially as described.

13. The combination with an engine-cylinder and steam-chest, of a housing formed to one side thereof and integral with said parts, said housing receiving the exhaust of the engine, and a valve-operating mechanism arranged within said housing, substantially as described.

14. In a steam-pump, the combination with the engine-cylinder and its piston, of a steam-chest, a slide-valve arranged in said steam-chest, a housing arranged to one side of said steam-chest and cylinder, a tappet arranged within the steam-chest for operating said slide-valve, an arm arranged within said housing and connected to said tappet, a rod for operating said arm, and a cross-head connection between said rod and the piston-rod of the engine, substantially as described.

In testimony whereof I hereunto affix my signature, in the presence of two witnesses, this 10th day of January, 1898.

WILLIAM W. COREY, JR.

Witnesses:
F. R. CORNWALL,
HUGH K. WAGNER.